United States Patent [19]

Reed et al.

[11] 3,885,628
[45] May 27, 1975

[54] RECOVERY OF OIL USING MICROEMULSIONS

[75] Inventors: Ronald L. Reed; Robert N. Healy; Donald G. Stenmark; Walter W. Gale, all of Houston, Tex.

[73] Assignee: Exxon Production Research Company, Houston, Tex.

[22] Filed: Jan. 2, 1974

[21] Appl. No.: 430,362

[52] U.S. Cl. ............... 166/252; 166/273; 166/274; 166/275
[51] Int. Cl. ........................................ E21b 43/22
[58] Field of Search ................... 166/273, 274, 252

[56] References Cited
UNITED STATES PATENTS
3,670,819  6/1972  Dauben et al. ................... 166/273
3,827,496  8/1974  Schroeder ......................... 166/273

Primary Examiner—Stephen J. Novosad
Assistant Examiner—George A. Suckfield
Attorney, Agent, or Firm—Lewis H. Eatherton

[57] ABSTRACT

Crude oil in a subterranean formation is recovered through the injection of at least one phase formed from a composition within the multiphase region of an oil-water-surfactant ternary diagram. One embodiment includes the injection of two or more mutually immiscible phases which would be in phase equilibrium within the multiphase region in the ternary diagram of a microemulsion system, at least one of the phases being a microemulsion. Low interfacial tensions exist between the immiscible phases in equilibrium. Where one of the phases in equilibrium comprises predominantly oil or predominantly water, in a further embodiment the microemulsion phase in equilibrium therewith can be injected alone to achieve efficient crude oil recovery. Where there are three phases in equilibrium, one of which comprises predominantly oil and another comprises predominantly water, in a further embodiment the remaining microemulsion phase in equilibrium therewith can be injected alone to achieve efficient crude oil recovery.

59 Claims, 5 Drawing Figures

RECOVERY OF OIL USING MICROEMULSIONS

BACKGROUND OF THE INVENTION

1. Field of the Invention

This invention relates to the recovery of oil from a subterranean formation through injection of microemulsion slugs; more specifically, this invention relates to the recovery of crude oil from subterranean formations by injecting thereinto at least one phase of a composition within the multiphase region of an oil-water-surfactant ternary diagram.

2. Description of the Prior Art

The crude oil which is accumulated in subterranean formations is recovered or produced therefrom through one or more wells drilled into the subterranean formation with the initial production of the crude oil being carried out by what is referred to as "primary recovery," i.e., where only initial formation energy is used to recover the crude oil. However, the primary recovery technique leaves substantial quantities of crude oil in the subterranean formation and, in addition, although containing large quantities of oil many formations are incapable of being produced efficiently by primary recovery techniques. Accordingly, recognition of the large amount of crude oil remaining in such reservoirs has led to the use of so-called "secondary and tertiary recovery" techniques with the primary purposes of economically recovering additional quantities of oil after primary depletion.

Probably one of the most common secondary recovery methods is the so-called "waterflooding" technique in which aqueous fluids are injected in at least one point in the reservoir at pressures sufficient to be forced out into the reservoir and toward a spaced production well or wells so as to effect a displacement of the oil from the pores of the reservoir and a driving of oil ahead of the water front to the production well or wells.

As can be easily understood waterflooding and similar secondary recovery techniques are only advantageous when the cost of the water and any additional necessary chemical modifiers is less than the value of the oil which is recovered after primary depletion. Accordingly, the displacement efficiency of the waterflood and similar techniques has been a determining factor in whether such techniques can be satisfactorily utilized in oil recovery.

The displacement efficiency of the water itself is relatively poor primarily due to the formation of discontinuous oil droplets from the continuous oil as the waterflood proceeds. Furthermore, there is a relatively high interfacial tension between the water and the oil which contributes to the capillary retention of the discontinuous oil and thereby prevents its displacement by water under pressure gradients feasible in reservoir flooding processes. The displacement efficiency decreases with increasing interfacial tension thereby making recovery of oil quite difficult.

As a result of the foregoing, various aqueous surfactant systems have been proposed for use in waterflooding processes for recovering oil. Thus it has been proposed that the interfacial tension between the oil and water can be reduced from a characteristic value approximating 35 dynes per centimeter to a value of less than one tenth dyne per centimeter with the proper selection of a surfactant or surfactants. The selection of a particular surfactant, however, depends not only upon the ability of the surfactant to reduce the oil/water interfacial tension but in addition the cost of the surfactant, since in any secondary or tertiary recovery technique the cost of the materials utilized must be significantly less than the value of the oil which can be recovered.

Not only can surfactants be utilized in secondary recovery techniques such as waterflooding but in addition aqueous surfactant solutions can be employed in tertiary recovery techiques utilized to recover residual oil from a "watered-out" reservoir. In such uses a slug of an aqueous surfactant solution is followed by a driving fluid to drive the slug of aqueous surfactant through the reservoir so as to allow displacement of the residual oil trapped in the pores of the reservoir. Here again the surfactant must be selected not only based on its ability to reduce the oil-water interfacial tension and thus allow for effective displacement of the oil but, in addition, the selection of a particular surfactant which can be utilized in these tertiary recovery techniques is based upon economic considerations.

More recently, secondary and tertiary recovery of crude oil has been proposed in which a microemulsion is injected into the subterranean formation. Such microemulsion can be defined as a stable transparent or translucent micellar solution of oil, water, and a surfactant with the optional presence of electrolytes and additional amphiphilic compounds, i.e., cosurfactant materials. The microemulsions eliminate certain disadvantages associated with the employment of aqueous surfactant solutions in that there is a lessened tendency for adsorption of the surfactant thereby making the utilization of the surfactant in the microemulsion more efficient.

Prior to development of the present invention, the microemulsions which have been proposed have been selected from compositions in the single phase region of the ternary diagram, generally either oil-external microemulsions or water-external microemulsions. These microemulsions have been adopted since in the injection of these microemulsions the initial stages of oil recovery involve an efficient miscible displacement with subsequent involvement of immiscible displacement upon a breaking down of the microemulsion into multiphases upon dilution of the microemulsion with crude oil and resident water at its leading edge and dilution with an aqueous drive fluid at its trailing edge. Accordingly, a criterion which can be applied in developing microemulsion compositions for use in secondary and tertiary oil recovery is a minimization of the multiphase region in the oil-water-surfactant ternary diagram so as to prolong miscible displacement, with low interfacial tensions in the multiphase regions so as to enhance immiscible displacement.

While the above criteria for the development of a microemulsion system have been proposed, the actual development of effective microemulsion systems which can economically recover the crude oil from a subterranean formation suffers from certain drawbacks in that it is difficult to maintain the miscible displacement and it is difficult to obtain thereafter the low interfacial tensions necessary to provide effective immiscible displacement of the crude oil. It is a further disadvantage that typically proposed microemulsion systems require high surfactant concentrations, usually in excess of about 7–15% by weight so as to provide a composition within the single-phase region of the ternary diagram.

These high surfactant requirements entail increased cost and unfavorable economics. Accordingly the art has long sought an effective microemulsion system and method of utilizing microemulsions for secondary and tertiary recovery of crude oil which eliminates disadvantages inherent in conventional systems.

SUMMARY OF THE INVENTION

It has been discovered in accordance with the present invention that the foregoing deficiencies and advantages of conventional systems, including the microemulsion systems previously proposed for the secondary and tertiary recovery of crude oil can be eliminated through a method in which the crude oil in a subterranean formation is recovered by injecting into the formation at least one phase of a composition in the multiphase region of an oil-water-surfactant ternary diagram. In one embodiment two or more mutually immiscible phases in equilibrium are injected. Still further, it has been discovered in accordance with the present invention that where one of the phases in equilibrium comprises predominantly oil, the advantages of the present invention can be obtained by injecting only the remaining microemulsion phase in equilibrium therewith thereby achieving in accordance with the present invention elimination of miscibility requirements, the ability to employ less surfactant and larger microemulsion slugs, and the ability to effectively and economically recover the crude oil in the subterranean formation. In a further embodiment of the present invention the objects and advantages thereof are achieved by injecting into a subterranean formation a microemulsion phase of a three phase system within the multiphase region of an oil-water-surfactant ternary diagram, the phases other than the microemulsion phase being a predominantly oil phase and a predominantly aqueous phase.

Accordingly, it is a principal object of the present invention to provide a method of recovering crude oil from a subterranean formation utilizing microemulsions, wherein such method eliminates the disadvantages and drawbacks of conventionally proposed methods.

It is a further object of the present invention to provide such method for the recovery of crude oil from a subterranean formation wherein displacement of the crude oil is effected by injecting into the formation at least one phase formed from a composition within the multiphase region of an oil-water-surfactant ternary diagram.

It is yet a further object of the present invention to provide such method for the recovery of crude oil wherein the recovery is effected by injecting into the subterranean formation at least two mutually immiscible phases in equilibrium at least one of which is a microemulsion.

A still futher object of the present invention comprises such method for the recovery of crude oil from a subterranean formation wherein the recovery is effected by injecting into the subterranean formation a microemulsion comprising an aqueous medium, an oil and at least one surfactant, optionally containing one or more cosurfactants, the microemulsion being one capable of equilibrating under the conditions of injection with a composition which is predominantly an oil phase.

A still further object of the present invention comprises such method for the recovery of crude oil from a subterranean formation wherein the recovery is effected by injecting into the subterranean formation a microemulsion comprising an aqueous medium, an oil and at least one surfactant, optionally containing one or more cosurfactants, the microemulsion being one capable of equilibrating under the conditions of injection with a composition which comprises an oil phase having minor amounts of surfactant dispersed therein and with a composition which comprises an aqueous phase having minor amounts of surfactant dispersed therein.

It is yet a further object of the present invention to provide a method for the recovery of crude oil from a subterranean formation wherein, based upon the injection of mutually immiscible slugs, at least one of which is a microemulsion, it is possible to effectively and economically recover the crude oil by allowing the employment of lesser amounts of surfactant and greater pore volume slugs.

Still further objects and advantages of the method of the present invention will become more apparent from the following more detailed description thereof.

DESCRIPTION OF PREFERRED EMBODIMENTS

Figure 1:
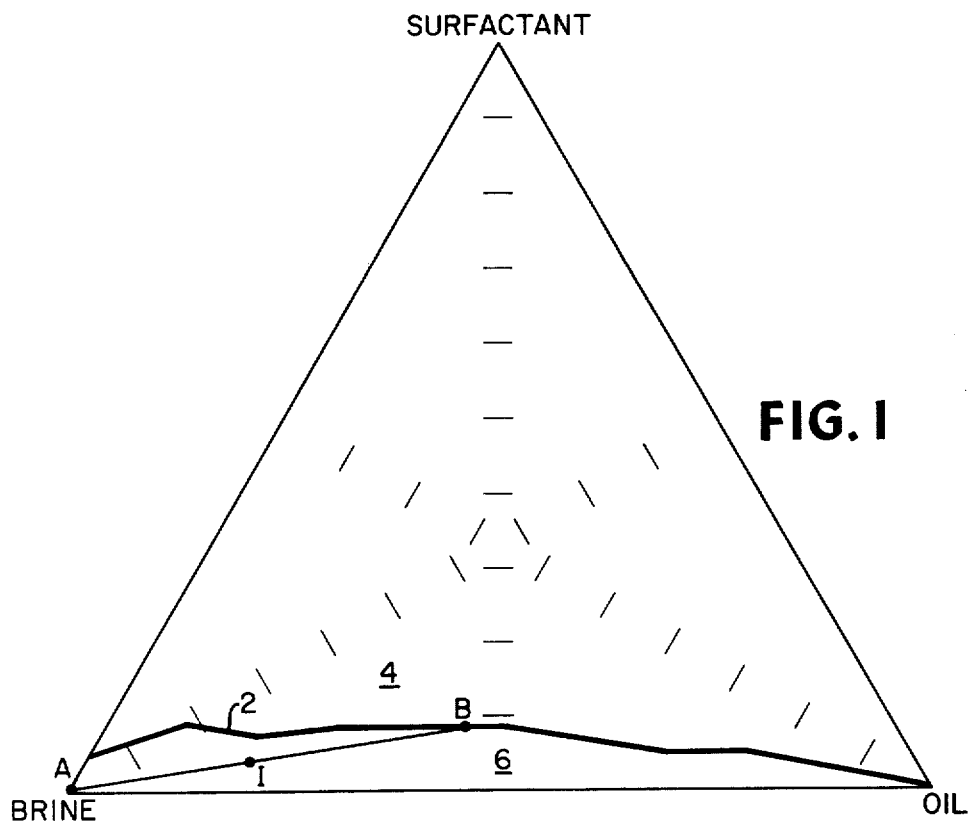
FIG. 1 is a ternary diagram representing the phase behavior of a typical oil-water-surfactant system in accordance with one embodiment of the present invention.

The foregoing objects and advantages of the present invention are achieved through the provision of injecting into a subterranean formation through one or more injection means, i.e., injection wells in fluid communication with one or more production means, i.e., production wells, one or more phases, at least one of which is a microemulsion, formed from a composition in the multiphase region of an oil-water-surfactant ternary diagram, the phase or phases injected being capable of displacing crude oil within the subterranean formation toward the production means so as to recover the displaced crude oil therethrough.

The characteristic features of the present invention lie in the discovery that a low interfacial tension exists between phases in equilibrium, specifically between those phases in equilibrium in the multiphase region of the oil-water-surfactant ternary diagram. Accordingly, it has been discovered in accordance with the present invention that when one or more phases from the multiphase region, at least one of which is a microemulsion, are injected into the subterranean formation, the low interfacial tension which exists allows for the effective recovery of the crude oil therein. Accordingly, the present invention provides in its broadest form the injection into the subterranean formation of one or more phases from the multiphase region of the oil-water-surfactant ternary diagram.

For purposes of simplification of one embodiment of the present invention to be described hereinafter, the phases into which a composition in the multiphase region of the ternary diagram separates can be identified as a more dense phase and a less dense phase. In fact, however, more than two phases can be formed, the phases being mutually immiscible and in equilibrium, with up to seven phases being observed. The phases which occur include in addition to recognizable microemulsions, a predominantly oil phase. In effect, an unlimited variety of phases can be formed from compositions within the multiphase region with the injection of one or more of these phases providing the objects and advantages of the present invention through the effective recovery of crude oil.

As will be appreciated from the discussion hereinafter, the present invention finds particular application wherein the composition falling within the multiphase region of the ternary diagram is prepared from an oil and aqueous medium having physical and chemical characteristics closely approximating the physical and chemical characteristics of the formation crude and water. Under such circumstances, those phases in equilibrium with the predominantly oil phase will show the required low interfacial tensions with the formation crude, thereby allowing the effective and efficient recovery of the formation crude oil by injection of one or more phases in equilibrium with such oil phase. This, therefore, allows for an efficient and economic recovery of the crude oil.

The multiplicity of phases in equilibrium allows a variety of different procedures for injection of the phase or phases. For example, as will be appreciated from the discussion hereinafter, the phases in equilibrium can be injected simultaneously, or consecutively, and, still further, only a single microemulsion phase can be injected to achieve the objects and advantages of the present invention. Also, it is possible to inject the phases consecutively with grading starting with 100% of the least dense phase, ending with 100% of the most dense phase. An unlimited number of possibilities exist based upon the fact that the objects and advantages of the present invention are achieved by injecting into the subterranean formation at least one phase formed from a composition within the multiphase region.

The description which follows in connection with the drawings illustrates and typifies three specific embodiments of the present invention. It should be recognized from a consideration of such discussion, however, that the description which follows is applicable to the variety of possible situations set forth above.

The characteristic features of the present invention can be understood by referring to the ternary diagram of FIG. 1. FIG. 1 represents a simplified ternary diagram for a brine-oil-surfactant system. With respect to FIG. 1 a binodal curve 2 separates a single phase region 4 from the multiphase region 6. While the simplified embodiment shown in FIG. 1 is one in which binodal curve 2 is illustrated to be a continuous curve separating the single phase region 4 from the multiphase region 6, in actuality the form of the binodal curve and the shape and location of the single phase and multiphase regions depend upon many factors including the type of surfactant, salt concentration of the brine, type of oil, temperature as well as the presence or absence of cosurfactants, additional electrolytes, etc. The simplified form of FIG. 1, however, provides for a ready understanding of the concepts of the present invention, it merely being necessary to appreciate that to apply the present invention to any particular system under particular conditions, it is merely necessary to carry out routine laboratory experimentation to determine the location and properties of the multiphase region for that particular system.

It can be seen from FIG. 1 that in this simplest embodiment the entire area above binodal curve 2 is a single phase region wherein a single phase microemulsion of oil, brine, and surfactant can be prepared. In this respect, as indicated previously, prior to development of the present invention, the microemulsions which have been proposed for utilization in secondary and tertiary recovery techniques for the recovery of crude oil have all been formed from compositions within the single phase region. All such previously proposed compositions have been those in which the composition in the single phase region of the ternary diagram was one which was at least partially miscible with both oil and water. The present invention differs considerably in concept from the use of a microemulsion selected from the single phase region for the secondary or tertiary recovery of crude oil in that in the method of the present invention a composition is selected from those compositions below the binodal curve, i.e., those compositions falling within the multiphase region of the ternary diagram wherein the phases are immiscible with oil or water or both oil and water. It has been discovered in accordance with the present invention that the employment of a composition in the multiphase region, more specifically at least one phase formed from such a composition of the multiphase region, and in one embodiment two or more mutually immiscible phases in equilibrium provides advantages not possessed by the use of a conventional microemulsion selected from the single phase region in that low interfacial tensions exist between the mutually immiscible phases in equilibrium and since the operation is carried out in the multiphase region less surfactant can be employed, thereby making it possible to employ larger slugs economically. This allows for the more economic and efficient secondary or tertiary recovery of the crude oil.

Turning again to FIG. 1, one embodiment of the present invention can be explained by referring to an example of the selection and utilization of two mutually immiscible phases in equilibrium. For example, suppose a composition is prepared from components wherein the bulk concentrations of brine, surfactant, and oil are 77% brine, 4% surfactant, and 19% oil. This point has been labeled I. The composition is in the multiphase region below the binodal curve 2, and in this example the mixture separates into two phases. One of these phases designated A is an aqueous phase possibly containing minor amounts of dispersed surfactant and comprising 52.9% of the original volume. The other phase B is a microemulsion comprising 47.1% of the original volume and is composed of 8.6% surfactant, 51.0% brine, and 40.4% oil. In this particular case, the ternary diagram is prepared by utilizing a brine which is 2% NaCl in distilled water; an oil which is a 90/10 Isopar-M/Heavy Aromatic Naphtha (HAN) mixture and a surfactant which is a monoethanolamine dodecyl orthoxylene sulfonate. The Isopar M and HAN are respectively trade names for refined paraffinic and aromatic oils sold by Exxon Company, U.S.A. When the interfacial tension between aqueous phase A and microemulsion B utilizing the foregoing components is measured it is found that the interfacial tension is 0.004 dyne per centimeter. This illustrates the extremely low interfacial tension between the mutually immiscible phases.

While FIG. 1 has been described primarily with regard to the presence of two phases within the multiphase region, i.e., an aqueous phase and a microemulsion phase, it is quite obvious that in some instances the multiphase region may involve a multiplicity of phases in equilibrium with up to seven phases having been observed. In many instances, however, the multiphase region will consist of two or three major phases in equilibrium.

As previously noted the microemulsions employed in accordance with the present invention may be defined as stable, transparent, or translucent micellar solutions of oil, water, and a surfactant, the microemulsion optionally containing electrolytes and one or more amphiphilic compounds, i.e., cosurfactants. Additionally the surfactant slug employed in the process of the present invention may contain, as required, mobility control agents such as thickeners so as to provide the desired mobility for the slug as it moves through the subterranean formation.

The aqueous portion of the microemulsion utilized in the method of the present invention can range from pure water to high salinity brine, i.e., a brine of up to 20% or more total dissolved solids in water including both natural and synthetic brines. In view of the fact that it is most desirable to provide compatibility of the microemulsion systems with the formation contents, in a preferred embodiment in accordance with the present invention the aqueous portion is selected so that the physical and chemical characteristics of the aqueous portion of the microemulsion broadly approximate the physical and chemical characteristics of the formation resident water. Accordingly, the salinity of the aqueous portion of the microemulsion preferably should broadly approximate the salinity of the formation water so as to provide optimum results with regard to compatibility and crude oil recovery.

The oil portion of the microemulsions utilized in the method of the present invention can comprise any conventionally utilized crude oil, both sweet and sour, as well as refined oils, e.g., side cuts from crude columns, crude column overheads, gas oils, kerosene, heavy naphthas, naphthas, straight run gasolines as well as commercially available refined aromatic and paraffinic hydrocarbons. The oil portion of the microemulsions can of course comprise blends of any of the foregoing including blends of crude and refined or partially refined oils.

In a manner similar to the case of the water component of the microemulsion, in a preferred embodiment of the present invention the oil component of the microemulsion should have physical and chemical characteristics broadly approximating the physical and chemical characteristics of the formation crude oil. This can be easily done by selection of a proper crude oil for preparation of the microemulsion and/or selection of refined oils or mixtures of refined oils having the requisite physical and chemical characteristics. The use of an oil component having physical and chemical characteristics broadly approximating those of the formation crude is advantageous in that compatibility is assured and the displacement ability of the microemulsion can be readily predicted and controlled. Accordingly, in this preferred embodiment of the present invention, both the water and oil components of the phase or phases injected into the subterranean formation have physical and chemical properties broadly approximating the crude oil and water of the formation.

The method of the present invention is not limited to any particular surfactant or type of surfactant, and any of the surfactants conventionally employed in surfactant flooding or microemulsion flooding can be advantageously utilized in the microemulsions and method of the present invention. For example, the surfactants applicable in accordance with the present invention can be any of those which are described in the following nonlimiting list of U.S. Pats: Nos. 3,254,714; 3,301,325; 3,330,344; 3,368,621; 3,455,386; 3,348,611; 3,455,385; 3,455,389; 3,443,635; 3,443,636; 3,406,754; 3,261,399; 3,297,985; 3,480,080; 3,478,823; 3,477,511; and 3,469,630.

The surfactants utilized in the microemulsions of the present invention can be anionic, nonionic, and/or cationic in character with the particularly applicable surfactants being petroleum and synthetic sulfonates as well as polyoxyalkylated organic materials and sulfates thereof. Anionic sulfonate surfactants can be illustrated by metal or ammonium salts of sulfonate surfactants, e.g., alkali metal or ammonium salts of sulfonated petroleum hydrocarbons such as alkylated naphthalene sulfonates, alkylated benzene sulfonates; or the sulfocarboxylate salts, and the like. Exemplary sulfonates are the alkali metal (Na, K, Li) or ammonium salts of petroleum sulfonates such as $C_{15-30}$ alkyl aryl sulfonates, alkylated benzene sulfonates and the like. Materials of this type are sold commercially under various trade names such as petroleum sulfonates sold by the Bray Chemical Company or the Bryton Chemical Company as Bryton Sulfonate, F, 430, 467, 500, or the Sonneborn Chemical Company as Petronates or the Socony Mobil Oil Company as "Promor" sulfonates of the SS-6, SS-20 series; American Cyanamid's "Aerosol OT" which is Na dioctyl sulfosuccinate and the like. A suitable sulfonate mixture is a sodium salt of a petroleum sulfonate in the molecular weight range of 350–420 and a sodium salt of a petroleum sulfonate in the molecular weight range of 420–580 or a sodium salt of a mixture of petroleum sulfonates having an average molecular weight in the order of about 430–470, and mixtures of such sulfonates from the above low and high molecular weights or other salts of such petroleum sulfonates.

Particularly applicable surfactants utilized in the method of the present invention are the synthetic sulfonates which can be generically described as $C_{6-18}$ orthoxylene or toluene sulfonates wherein the salt forming cation is selected from alkali metals, ammonium, and amines such as $C_{1-4}$ mono-, di-, and tri- alkanol amines, an example being monoethanolamine. A particularly applicable surfactant showing excellent characteristics in the environment of the present invention is a monoethanolamine $C_{12}$ orthoxylene sulfonate, i.e., an orthoxylene sulfonate containing a carbon chain predominating in $C_{12}$.

Sulfated polyoxyalkylated organic material surfactants can be prepared by suitable means such as sulfating with chlorosulfonic acid, sulfur trioxide, sulfonic acid, oleum or sulfuric acid in a suitable solvent, a surface-active water soluble oxyalkylated organic material having from about 8 to about 20 carbon atoms. Preferred materials comprise ethoxylated alcoholic compounds such as oxyalkylated alkanols which can be represented by the formula $RO(C_2H_4O)_{2-10} - H$; where R is an alkyl radical of 10-15 carbon atoms, the alcohol used in the ethoxylation being a mixture of alcohols of 10-15 carbon atoms.

Sulfates of ethoxylated primary alcohols are commercially available from Shell Chemical Company under the trade name Neodol 23-3A having the formula $C_{12-13}O(CH_2CH_2O)_3SO_3 NH_4$ and Neodol 25-3S of the formula $C_{12-15}O(CH_2CH_2O)_3SO_3Na$.

Other anionic sulfated ethoxylated alcohols are available from Union Carbide under the trade name Tergitol S such as Tergitol Anionic 14-S-3A (ammonium salt) or 15-S-3.0 (sodium salt).

It should be appreciated that the method of the present invention is not surfactant dependent and while the form of the binodal curve and the location and size of the multiphase region may change as a function of the surfactant, the concept of the present invention is applicable regardless of the type of surfactant as long as the surfactant is employed in an amount in excess of the critical micelle concentration in at least one phase so as to form the desired microemulsion and as long as at least one microemulsion phase of the multiphase composition is injected into the subterranean reservoir.

With regard to the amounts or concentrations of the three essential components of the composition, i.e., oil, water and surfactant, it is pointed out again that it is merely necessary for the surfactant to be present in a concentration in excess of the critical micelle concentration in at least one phase so as to allow formation of the microemulsion. An amount of from about 0.1 to about 20% by volume based on the volume of the microemulsion is generally applicable. In this regard, it should be recognized that since the compositions of the present invention are selected from those within the multiphase region of the ternary diagram, it is possible to utilize less surfactant than conventionally necessary when a microemulsion selected from the single-phase region is injected to recover crude oil. This is an advantage of the present invention which allows for an efficient and economic recovery of the crude oil and allows for the use of larger slugs.

With respect to the concentration of oil and water in the microemulsions it is pointed out that no limitations are placed thereon except the obvious limitation that the amount of oil and water must be such that the composition falls within the multiphase region of the ternary diagram. With these guidelines it is obvious that the selection of any particular concentration of oil and water to meet particular requirements can be easily carried out, it being noted that the objects and advantages of the present invention are achieved when the composition of oil, water, and surfactant falls within the multiphase region of the ternary diagram and in this first specific embodiment of the present invention the phases which are mutually immiscible and in equilibrium are injected into the subterranean formation so as to effectively recover the crude oil present therein.

Microemulsions conventionally optionally contain additional electrolytes and one or more cosurfactants. Suitable electrolytes in addition to the sodium chloride of the brine include for example other alkali metal or ammonium salts of anions such as chlorides, sulfates, nitrates, carbonates, phosphates, or the like and mixtures thereof. Again it is pointed out that in a preferred embodiment the aqueous component containing the electrolyte preferably has a salinity and physical and chemical characteristics broadly approximating those of the formation water. This therefore will determine the types of electrolytes which should preferably be included within the composition.

The microemulsions useful in the method of the present invention may additionally contain one or more cosurfactants or cosolubilizers such as can be employed in microemulsions for viscosity control and to adjust brine tolerance. Typical examples of such cosurfactant include alcohols, amides, amino compounds, esters, aldehydes and ketones containing 1 to about 20 or more carbon atoms with compounds containing from 3 to about 16 carbon atoms being preferred. In addition, the ethoxylated alcohols and phenols, sulfated and sulfonated ethoxylated alcohols and phenols as well as synthetic sulfonates described with regard to applicable surfactants can be effectively employed as cosurfactants in accordance with the present invention. Typical alcohol cosurfactants include, for example, isopropanol, n- and isobutanol, t-butanol, and amyl alcohols such as n-amyl alcohol, t-amyl alcohol, 1- and 2- hexanol, 1- and 2- octanol, decyl alcohols, alkyl aryl alcohols such as p-nonylphenol; hydroxy compounds such as 2-butoxyethanol, etc. and alcoholic liquors such as fusel oil. Particularly applicable cosurfactants in the method of the present invention include the lower alcohols. The ethoxylated alcohols which are applicably employed as the cosurfactant in the method of the present invention are generally ethylene oxide adducts of $C_6$ to $C_{20}$ primary alcohols wherein the adduct contains from 1 to about 100 moles of ethylene oxide. Such ethoxylated alcohols are available commercially from Shell Chemical Company under the tradename "Neodol" or from Conoco under the name "Alfol" and others. For example, the Neodol identified as Neodol 23-6.5 is a mixture of $C_{12}$-$C_{13}$ alcohols having an average of 6.5 ethylene oxide groups. Conoco "Alfol" alcohols such as Alphonic 1012-6 or 1218-6 have the following structural formulas: $CH_3 - (CH_2)_x - O-(CH_2CH_2O)_nH$; where $x$ is an integer of from 8 to 16 and $n$ is an integer of 5 to 8. Alphonic 1012-6 is a $C_{10}$-$C_{12}$ primary alcohol containing six ethylene oxide units and Alphonic 1218-6 is a $C_{12}$-$C_{18}$ primary alcohol containing six ethylene oxide units. These ethylene oxide adducts of primary alcohols as well as related materials can be conveniently employed as the cosurfactant in the method of the present invention.

The sulfated polyethoxylated alcohol cosurfactant can be prepared from any of the above noted surfactants.

The ethoxylated phenols which can be effectively employed as the cosurfactant in accordance with the method of the present invention comprise ethylene oxide adducts of alkylated phenols such as octyl phenols, nonyl phenols, etc. The number of ethylene oxide groups varies from 1 to about 100 with up to 10 ethylene oxide groups being preferred. These adducts of ethylene oxide and alkyl phenols can be prepared by techiques which are well known and the adducts are commercially available materials.

For example, ethylene oxide adducts of nonyl phenols having varying numbers of ethylene oxide units are available commercially under the "Triton-N" series from the Rohm and Haas Company, Philadelphia, Pa., and also under the name "Igepal" available from GAF Corporation, Dyestuff and Chemical Division, and also from Antara Chemicals. Also, ethylene oxide adducts of octyl phenols are available commercially under "Triton X" series of Rohm and Haas.

The sulfated ethoxylated phenols can be prepared by techniques well known in the art, the techniques being similar to the sulfation technique described previously with regard to the sulfated ethoxylated alcohols. Accordingly, any of the above noted ethoxylated phenols can be sulfated with the sulfated ethoxylated phenols being applicably employed as a cosurfactant in the method of the present invention.

The sulfonated ethoxylated phenols applicable in accordance with the present invention can be represented by the formula:

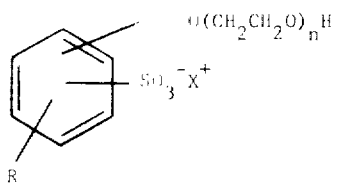

wherein R is a $C_{6-18}$ alkyl group, $n$ is an integer of 1–100, and X is a suitable cation. These materials can be prepared by alkylation of phenol, sulfonation of the alkylated phenol and subsequent ethoxylation. Similarly, the sulfonated ethoxylated alcohols can be conveniently prepared by sulfonating any of the ethoxylated alcohols previously discussed.

The synthetic sulfonates which are applicable as cosurfactants in accordance with the present invention include a group of materials having a structural formula:

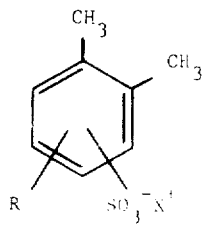

wherein X is a suitable cation and R is a $C_{1-7}$ alkyl group.

It should be readily apparent from the above that the discussed cosurfactants are merely exemplary of the variety of cosurfactants which can be employed to increase the brine tolerance and adjust the viscosity of one or more phases injected in accordance with the present invention. Accordingly, any cosurfactants capable of adjusting the brine tolerance, temperature tolerance or viscosity of a microemulsion can be effectively utilized either singly or in combination of two or more in the method of the present invention and the present invention is not to be deemed as limited to those exemplified above.

The cosurfactant is generally employed in an amount of from about 0.01% to about 20% or more based upon the injection system. Here again since the composition is in the multiphase region, effective methods of recovering crude oil can be carried out utilizing lesser amounts of the cosurfactant when needed than necessary in conventional microemulsion flooding methods.

Figure 2:
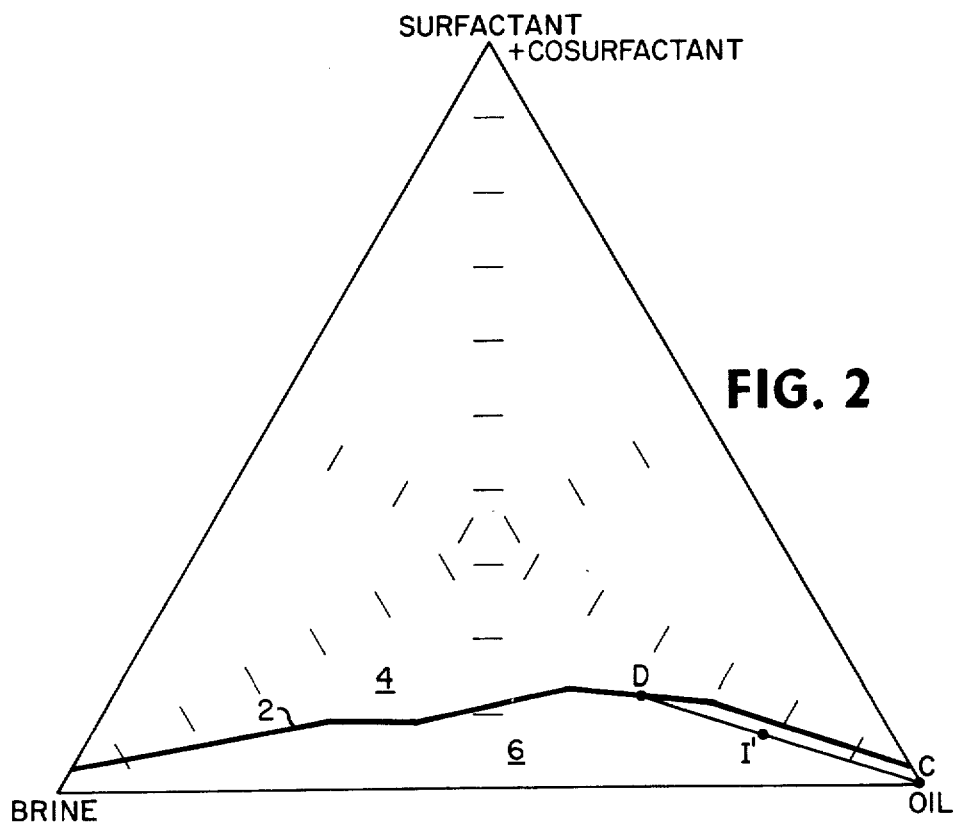
FIG. 2 is a ternary diagram representing the phase behavior of a typical oil-water-surfactant system in accordance with another embodiment of the present invention.

A second specific embodiment of the present invention can be seen by a reference to FIG. 2 which also represents a ternary diagram for oil, water and surfactant, the ternary diagram being drawn again to represent the simplest form wherein a continuous binodal curve 2 separates the multiphase region 6 below the binodal curve 2 from the single-phase region 4 above the binodal curve. Referring to FIG. 2, assume that a composition I' is prepared in the multiphase region by mixing the brine, oil and surfactant in such proportion that the composition comprises 78% oil, 15% brine, and 7% surfactant. As seen in FIG. 2 this composition separates into an oil phase C which is 44% by volume of the total and a microemulsion phase D which is 56% by volume of the total. The interfacial tension between these phases is 0.004 dyne/cm. The surfactant-cosurfactant mix is 63/37 monoethanolamine $C_{12}$ o-xylene sulfonate/t-amyl alcohol, brine is 1% NaCl, and oil is 90/10 Isopar M/HAN. As will be described hereinafter, in this embodiment of the present invention wherein a major phase in the multiphase region is predominantly oil which may contain minor amounts of dispersed surfactant, the objects and advantages of the present invention can be achieved by carrying out the method of the present invention by injection into the subterranean formation of only the microemulsion phase in equilibrium therewith.

The reason the objects and advantages of the present invention can be achieved in this second specific embodiment of the present invention by injection of the microemulsion phase only is that the low interfacial tensions which are characteristic of the present invention are achieved between the microemulsion and the formation crude since in a preferred embodiment of the present invention the physical and chemical characteristics of the oil phase C in equilibrium with the microemulsion phase D will be approximately the same as the physical and chemical characteristics of the formation crude. Accordingly, since this low interfacial tension can be achieved between the formation crude and the microemulsion merely by injection of the microemulsion the objects and advantages of the present invention can be efficiently achieved in a manner not heretofore contemplated with conventional microemulsion recovery processes. Since an oil phase need not be injected in this embodiment of the present invention the process becomes even more economical and a more efficient recovery of the crude oil can be achieved.

Figure 3:
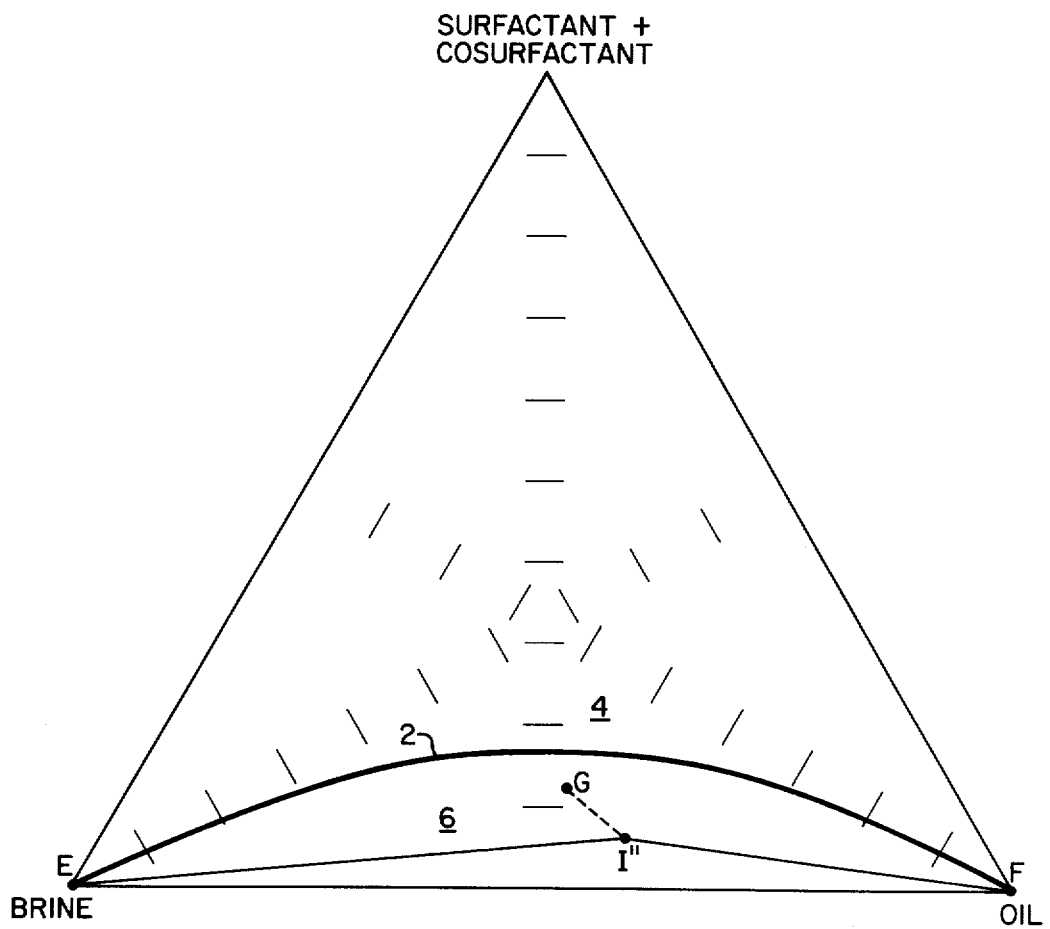
FIG. 3 is a ternary diagram representing the phase behavior of a typical oil-water-surfactant system in accordance with a still further embodiment of the present invention.

A further embodiment of the present invention can be seen by reference to FIG. 3 which represents a ternary diagram for oil, water, and surfactant; the ternary diagram being drawn again to represent a situation wherein a continuous binodal curve 2 separates the multiphase region 6 below the binodal curve 2 from the single-phase region 4 above the binodal curve. Referring to FIG. 3 assume that a composition I'' is prepared in the multiphase region by mixing a brine, oil, and surfactant in such proportions that the composition comprises 59% oil, 38% brine, and 3% of the surfactant and cosurfactant mixture. In the particular embodiment illustrated in FIG. 3, the brine is 1.25% NaCl in water, the oil is a 90/10 mixture of Isopar M/HAN and the surfactant composition is a 63/37 ratio mixture of a monoethanolamine $C_{12}$ orthoxylene sulfonate and tertiary amyl alcohol as the cosurfactant.

Upon sitting the composition formed in the multiphase region of the ternary diagram as described above separated into three phases, phase E being a brine phase possibly containing minor amounts of dispersed surfactant, phase F being an oil phase possibly containing minor amounts of dispersed surfactant, and phase G being a microemulsion immiscible with both the brine phase E and oil phase F and having a density intermediate the two. It can be noted from FIG. 3 that the microemulsion phase G is not on the binodal curve 2 but rather is close thereto. In this regard, it should be noted that while the phases into which a composition in the multiphase region of the ternary diagram separates are theoretically on the binodal curve 2, in actuality it has been found that such compositions may be on the binodal curve or close to the binodal curve. Each of such situations is therefore within the scope of the present invention and no differentiation is made between those compositions on or close to the binodal curve.

Upon analyzing the phases into which composition I'' separates, it is found that the brine phase E possibly containing minor amounts of dispersed surfactant comprises 12% of the total volume of the composition while oil phase F possibly containing minor amounts of dispersed surfactant comprises 32% of the total volume of the composition. The microemulsion phase G comprises 56% of the total volume of composition I''. Analysis of microemulsion phase G finds that the microemulsion is approximately 48.2% oil, 46.4% brine, and 5.4% of the surfactant system, i.e., surfactant and cosurfactant. When the interfacial tensions between phases G and E and phases G and F are measured, it is found that the interfacial tension between phase G and phase E is 0.002 dyne/cm. and the interfacial tension between phase G and phase F is 0.002 dyne/cm.

The embodiment of the present invention exemplified by FIG. 3 constitutes a principal embodiment within the scope of the present invention in that the objects and advantages of the present invention can be effectively achieved by injecting into the subterranean formation only the microemulsion phase G which phase is immiscible with the brine phase E and oil phase F. Accordingly, by injecting into the subterranean formation the microemulsion phase G it is possible to effectively recover the crude oil present therein, low interfacial tensions being exhibited particularly where the brine and oil components of the microemulsion phase G have physical and chemical characteristics approximating the physical and chemical characteristics of the formation crude. Since the microemulsion phase G in accordance with this embodiment of the present invention contains a substantial proportion of the surfactant and cosurfactant introduced in composition I'', the method of recovering crude oil therewith can be carried out efficiently and economically particularly when compared with conventional microemulsion flooding techniques.

As can be readily appreciated from the above in this further embodiment of the present invention effective crude oil recovery is achieved by injecting into the subterranean formation the middle phase, i.e., microemulsion phase of the three-phase system which includes a predominantly oil phase, a predominantly aqueous or brine phase, and a microemulsion phase. In addition to the advantages associated with the injection of only the microemulsion phase into the subterranean formation for the recovery of the crude oil therein, the injection of the middle phase of this three-phase system has further advantages, particularly when the microemulsion is driven through the subterranean formation by utilization of a drive fluid containing a polymer thickener or mobility control agent. In this regard it has been discovered in accordance with the present invention that the polymer drive fluid is immiscible with the middle phase microemulsion, this fact being of particular importance since the polymer is effectively excluded from the microemulsion phase and there is no deleteterious interaction between the surfactant micelles and the polymer, which interaction in conventional systems often gives rise to precipitation of a solid or gel-like phase which can plug the porous medium and often gives rise to unfavorable fingering and mixing phenomens between the surfactant slug and polymer drive fluid. Accordingly, this immiscibility between the middle phase microemulsion of the three-phase system and polymer drive fluid comprises a further advantage to the utilization of this microemulsion phase.

It should be readily apparent that the injection of the middle phase microemulsion is advantageous from the standpoint of oil recovery in that such middle phase microemulsion is immiscible with the formation oil, formation water, as well as a polymer drive fluid utilized to drive the microemulsion slug through the subterranean formation. It should be understood with regard to this embodiment of the present invention that while the foregoing discussion has been set forth in relation to a three-phase system, it is possible for the system to include minor amounts of additional phases although in this embodiment of the present invention three major phases will be present, a predominantly oil phase, a predominantly aqueous or brine phase, and a middle microemulsion phase.

As can be readily appreciated, the objects of any microemulsion recovery process are to make the displacement, be it miscible or immiscible, as efficient as possible so as to effectively and efficiently displace the crude oil within the subterranean formation. Accordingly to achieve this, in the embodiment of the present invention previously described, it is essential to inject the microemulsion phase prior to or concurrently with the water phase, where more than one phase is injected, so as to enhance the miscible and immiscible displacement of the crude oil. In this respect, the injection of such phases can be carried out consecutively or concurrently, although, where two or more immiscible phases in equilibrium are injected the microemulsion phase should be injected prior to the water phase. Where two or more immiscible phases in equilibrium are injected, it is, of course, possible to inject all the phases simultaneously or concurrently or in a consecutive fashion as discussed above. Where the phases in equilibrium are injected consecutively, efficient injection and crude oil recovery can be achieved by consecutive injection with grading, i.e., starting with 100% of the first phase, decreasing the first phase while increasing the second phase until the injection is 100% of the second phase and continuing this procedure for the number of mutually immiscible phases to be injected. In short, the method of the present invention is applicable to a variety of possible injection schemes, all providing the requisite low interfacial tensions for maximum oil recovery.

As previously indicated, since the method of the present invention operates in the multiphase region of the ternary diagram representing the water, oil, and surfactant system, it is possible to employ lesser amounts of surfactant than necessary in conventional microemulsion recovery methods while retaining excellent recovery efficiency. This therefore allows even greater efficiency by utilization of larger microemulsion slugs while still maintaining the same economic characteristics associated with previously proposed microemulsion recovery methods.

Generally, the microemulsion slugs injected into the subterranean formation in accordance with the present invention are slugs of from about 0.02 to 2 PV, preferably 0.05 to 0.5 PV. For purposes of economics, it is preferred in accordance with the present invention to minimize the injection of the microemulsion slug and it is preferred to inject such microemulsion slug in an amount from about 0.02 to 0.2 PV. Of course, where more than one slug is injected, the volume of each slug injected can be accordingly adjusted. Again, in the further embodiment of the present invention wherein a phase in equilibrium with a microemulsion phase is an oil phase itself, the process can be carried out even more economically by omission of injection of the oil phase. For economic considerations, it is preferably in accordance with the present invention to inject more of the high water content phase when both a high water content phase and a high oil content phase are injected into the subterranean formation. The selection of any particular slug size for injection can, of course, be determined based upon such considerations as the nature of the crude oil, nature of the resident brine and nature of the subterranean formation.

The method of the present invention can be applied as a tertiary recovery method subsequent to primary depletion and waterflooding of the formation. However, under certain circumstances, the process of the present invention can be utilized in lieu of waterflooding.

Following injection of one or more phases in accordance with the present invention, a bank of thickened water will be injected into the formation to drive the injected phase or phases through the formation to one or more production wells in fluid communication with the injection well or wells thereby allowing recovery of the crude oil through the production wells. The thickened water may comprise either ordinary water containing one or more conventionally employed thickeners or a brine in which one or more conventionally employed thickeners have been added for the purposes of providing the desired thickening and mobility. Typical thickeners which have been previously utilized to provide a thickened water comprise water-soluble polymeric materials such as carboxymethyl cellulose, polyethylene oxide, high molecular weight salts of polymers containing amide and carboxylic groups produced by polymerizing acrylamide or its homolog such as methacrylamide and partially hydrolyzing the amide groups and the like. Particularly suitable thickeners comprise high molecular weight polyelectrolyte polymers such as partially hydrolyzed polyacrylamides sold for example under such trade names as "Pusher" from Dow Chemical Company. An additional class of polymers suitable as thickeners and mobility control agents are the bipolymers or polysaccharides such as "Kelzan XC" available from the Kelco Company. Also a new class of thickeners, sulfated polyoxyalkylated alcohols, as described in patent application, Docket No. PD-C-800, assigned to Esso Production Research Company and filed concurrently herewith, can be effectively used. Any and all of these thickeners or various mixtures of them can, of course, be employed in the method of the present invention to provide a driving of the microemulsion slugs through the subterranean formation.

In addition to the utilization of the thickened water, the injected phase or phases themselves may contain mobility control agents such as described above, the mobility control agents being optionally employed in one or more of the phases injected into the formation. When the bank of thickened water is injected into the formation subsequent to the microemulsions which may contain a mobility control agent, a favorable mobility ratio is created at the microemulsion system — thickened water interface.

In carrying out the method of the present invention one or more oils, aqueous media and surfactants, with optional thickeners, electrolytes and cosurfactants are mixed in such proportions that a composition falling within the multiphase region of the oil-water-surfactant ternary diagram is formed. This composition which is formed is allowed to separate into a multiplicity of mutually immiscible phases in equilibrium. In one embodiment of the present invention, the composition in the multiphase region will separate into a high water content phase and a high oil content phase. In fact, however, the composition which is formed by mixing the oil, aqueous medium and surfactant can separate into many separate mutually immiscible phases in equilibrium with up to 7 being observed, although the composition will often separate into two or three major phases with any remaining phases being of a minor character. In carrying out the method of the present invention to achieve the objects and advantages thereof, the mutually immiscible phases in equilibrium can be injected concurrently or consecutively into the subterranean formation. In this respect even where up to 7 phases in equilibrium are present, the phases as a whole can be injected into the subterranean formation. In one specific embodiment of the present invention however, the high oil content phase is injected into the formation with subsequent injection of the high water content phase, either or both of which may be microemulsions. This allows for a most efficient recovery of the oil while effectively providing the necessary low interfacial tensions for crude oil recovery.

As indicated previously, while the composition which is formed in the multiphase region of the ternary diagram in one embodiment of the present invention breaks down into a multiplicity of phases in equilibrium, in the further embodiment of the present invention previously described, one of the major phases is a predominantly oil phases, i.e., predominantly the oil coordinate of the ternary diagram, generally an oil phase having minor amounts of surfactant dispersed therein. Again, in a preferred embodiment the oil utilized to form the microemulsion will have physical and chemical characteristics broadly approximating the physical and chemical characteristics of the formation crude oil. Since the immiscible phases in equilibrium with this oil coordinate show a very small interfacial tension therewith, a very small interfacial tension will also be exhibited between the phases in equilibrium with this oil phase and the crude oil in the subterranean formation. Accordingly under such circumstances, it is merely necessary to separate one or more of the microemulsion phases mutually immiscible with the oil coordinate and to inject such one or more phases into the formation absent injection of the oil phase. This allows an even more efficient recovery of the crude oil from an economic standpoint. Here again, it is of course within the bounds of the present invention to inject only a single phase in equilibrium with the oil phase, i.e., a microemulsion phase, or to inject two or more of the phases in equilibrium therewith either concurrently or consecutively.

Utilization of the method of the present invention will generally be carried out by mixing the oil, aqueous medium and surfactant with optional thickeners, additional electrolytes, and cosurfactants in the proper proportions but in small amounts, i.e., amounts smaller than will be injected into the subterranean formation. Under such circumstances upon separation of the microemulsion into a multiplicity of phases, the phases will be analyzed to determine the chemical constituency thereof and the mutually immiscible phases in equilibrium will thereafter be individually prepared for injection into the subterranean formation. This eliminates the problems of large scale separation of the mutually immiscible phases wherein simultaneous injection of the mutually immiscible phases is not desired. It should be recognized from this discussion that since the injection phase or phases can be separately prepared prior to injection based upon the analysis of a composition prepared in a smaller amount, the phase or phases injected into the subterranean formation may not be of precisely the same composition as the phase or phases prepared in the lesser amounts in view of possible fractionation of surfactants or cosurfactants between phases, redistribution of salts between phases and uncertainties in component analyses and therefore the phase or phases may technically not be in equilibrium with any other phases. However, the expression "in equilibrium" as used throughout is meant to include this situation wherein the phase or phases injected into the subterranean formation are capable of equilibrating under the conditions of injection with one or more mutually immiscible phases within the multiphase region of the oil-water-surfactant ternary diagram.

It is possible in accordance with the present invention to effect a mixing of the oil, aqueous medium and surfactant in sufficiently large amounts to be subsequently utilized with utilization of the formed microemulsion subsequent to phase separation either with or without removal of individual phases in equilibrium. Each of these embodiments is within the scope of the present invention although the former is preferred from the standpoint of equipment requirements and economics. The methods and apparatus necessary to analyze the microemulsion from a chemical constituency standpoint are of course well known and any of the conventional techniques and apparatus can be utilized in carrying out the method of the present invention.

The method of the present invention will now be described by reference to the following specific examples. It should be understood that such examples are presented for purposes of illustration only and the present invention cannot under any circumstances be deemed as limited thereby. In the Examples, brine concentrations are presented as percent by weight; all other percentages, unless otherwise indicated, are by volume.

EXAMPLE I

This example was carried out to illustrate the effectiveness of the method of the present invention with respect to the injection of at least two mutually immiscible phases for the recovery of crude oil and reduction of final oil saturation. A composition in the multiphase region of the ternary diagram was prepared by mixing the following components:

1% surfactant (monoethanolamine $C_{12}$ orthoxylene sulfonate);
20% oil (a 90/10 mixture of Isopar M/HAN) and p1
79% aqueous medium (2% NACl water).

The microemulsion upon sitting separated into four phases, including three microemulsion phase and an oil phase. The oil phase was the least dense phase and possible contained minor amounts of dispersed surfactant. The microemulsion phase hereinafter referred to was the most dense microemulsion phase. The interfacial tension between the microemulsion and the oil phase was measured by the sessile drop technique with an interfacial tension of 0.007 dyne/centimeter being found.

A 0.2 PV bank of the oil phase was injected into a 1 foot long Berea core containing 90/10 Isopar M/HAN as residual oil and 2% NaCl water as the resident water. The bank of the oil phase was followed by a 1.8 PV bank of the microemulsion in equilibrium therewith. The oil phase and microemulsion in equilibrium were injected at a 1 foot per day frontal velocity and after injection of the amount set forth above, the final oil saturation of the core was determined. Taking into account the injected oil, the core had a final oil saturation of 9.0% illustrating the effectiveness of the injection of the mutally immiscible phases to reduce the residual oil content of the core.

EXAMPLE II

Figure 4:
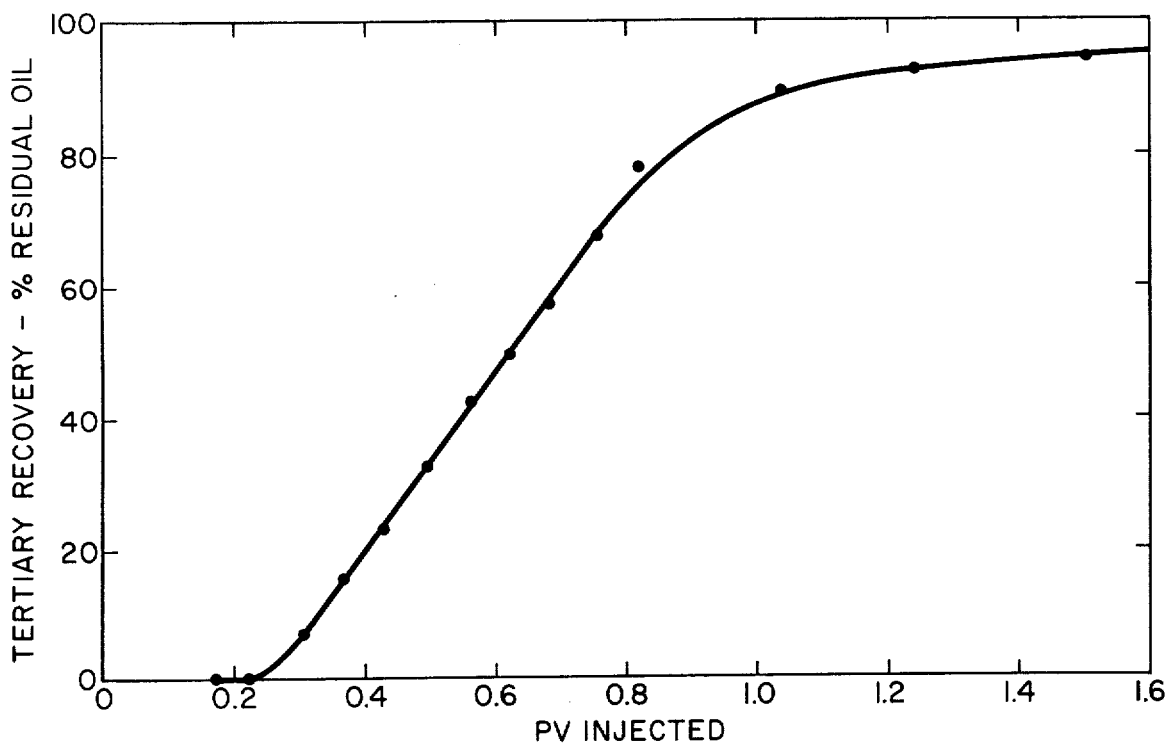
FIG. 4 is a plot of the tertiary recovery in percent of residual oil versus PV injected for an example of consecutive injection of an oilphase and a microemulsion in equilibrium therewiith.

Example II was carried out in a manner similar to Example I to illustrate the effectiveness of the injection of two immiscible phases in equilibrium with respect to the residual oil content of 1 foot long cores. In this example a composition in the multiphase region of ternary diagram was formed by mixing 7% of a surfactant mixture of the monoethanolamine $C_{12}$ orthoxylene sulfonate and as a cosurfactant tertiary amyl alcohol in a ratio of 63/37, 78% of an oil mixture of Iospar M/HAN in a ratio of 90/10 and 15% of a 1% NaCl water. Upon standing, the composition which formed in the multiphase region of the ternary diagram through the mixture of the above materials separated into two phases, the volume of the upper phase being 44% of a total volume. The viscosity of the upper phase measured at 11.5 sec$^{-1}$ was 2.4 cp and the viscosity of the lower phase measured at 11.5 sec$^{-1}$ was 10 cp. The upper phase was oil possibly containing minor amounts of dispersed surfacent while the lower phase was a microemulsion. When the interfacial tension between the two phases in equilbrium was measured by the sessile drop technique, an interfacial tension of 0.004 dyne/centimeter was found. A 4.4% PV bank of the upper phase, oil, was injected at 1foot per day into a 1 foot long Berea core containing residual 90/10 Isopar M/HAN as the resident oil and 1% NaCl water as the resident brine. This bank of the upper phase was followed by injection of a 5.6% PV bank of the lower phase microemulsion which in turn was driven through the core by an aqueous flood comprising 1,000 ppm Kelzan XC in 1% NaCl water. The recovery curve plotting the tertiary recovery in percentage of residual oil versus the pore volume injected can be seen in FIG. 4. By injection of the mutually immiscible phases a final oil saturation accounting for the injected oil of 8.1% is obtained.

EXAMPLE III

The procedure of Example II was repeated except that the upper phase, the oil phase, was not injected and only the lower phase microemulsion was injected into the core. The microemulsion phase was injected as a 5.6% PV bank having the following approximate composition:

12.5% of the surfactant mixture, monoethanolame $C_{12}$ orthoxylene sulfonate/tertiary amyl alcohol in a ratio of 63/37;
61% of the oil, Isopar M/HAN in a 90/10 ratio; and
26.5% of the aqueous medium, 1% NaCl water.

Figure 5:
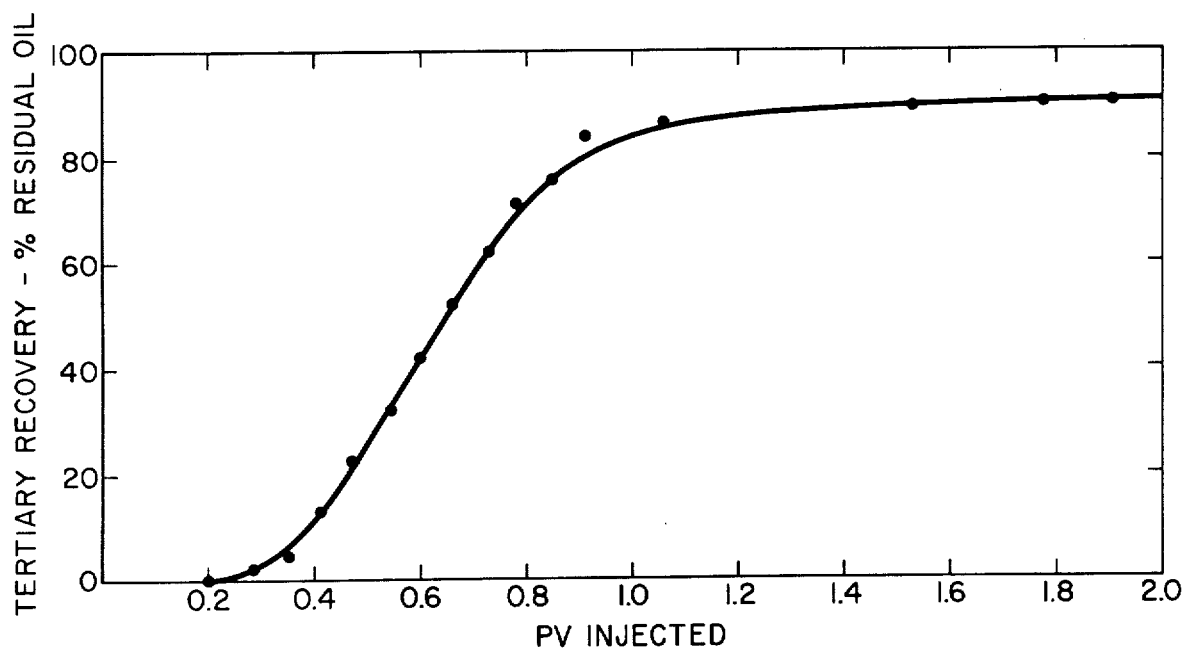
FIG. 5 is a plot of the tertiary recovery in percent of residual oil versus PV injected for an example of injection of only a microemulsion phase having a composition in equilibrium with an oil phase.

The injection of the upper oil phase was omitted since this phase was predominantly oil of the same characteristics as the resident oil, 90/10 Isopar M/HAN. When all other parameters were maintained as in Example II, a final oil saturation accounting for injected oil of 6.4% was achieved. FIG. 5 shows the tertiary recovery in percentage of residual oil versus the pore volume injected. This Example therefore illustrates the effectiveness of the present invention when only the lower microemulsion phase in equilibrium with an oil phase is injected so as to displace residual oil.

EXAMPLE IV

A 4 foot long core flood was carried out by a procedure similar to that of Example III. In this respect the same microemulsion was injected into a 4 foot long Berea core at a frontal velocity of 1 foot per day followed by injection of a driving fluid comprising 1,000 ppm Kelzan XC in 1% NaCl water. As a result of this flooding of the 4 foot long core containing residual 90/10 Isopar M/HAN a final oil saturation, accounting for injected oil of 10.4% was obtained. Here again, this illustrates the effectiveness of the present invention when only a lower phase microemulsion, in equilibrium with and mutually immiscible with a predominantly oil phase is injected to displace crude oil.

EXAMPLE V

This example was carried out to illustrate the effectiveness of injection of only the middle phase of a three-phase system obtained by equilibrating a composition within the multiphase region of the ternary diagram.

A first composition in the multiphase region of the oil-water-surfactant ternary diagram was prepared by mixing 0.48 g Pyronate 30 (source, Witco Co.), 0.75 g Acto 639 (source, Exxon Co., U.S.A.), 49.4 ml Isopar M/HAN oil mixture in the ratio 90/10 and 49.4 ml of 2.0% NaCl. When the mixture was allowed to settle, a three-phase system was formed wherein the upper nd least dense phase amounted to 30 ml and consisted of oil containing 0.024% by wt. of surfactant, the lower and most dense phase amounted to 31 ml and consisted of brine and some surfactant visually evident, and the middle phase amounted to 39 ml and was a microemulsion containing the above mentioned oil, brine and petroleum sulfonates.

A second composition in the multiphase region of the oil-water-surfactant ternary diagram was prepared by mixing 1.0% monoethanolamine $C_{12}$ orthoxylene sulfonate, and 0.9% of a cosurfactant, i.e. $C_{12}H_{25}O(CH_2CH_2O)_{3.6} SO_3^- NH_4^+$, and 49% of an oil comprising a 90/10 Isopar M/HAN and 49% of Tar Springs Brine. The lower phase was Tar Springs Brine possibly containing minor amounts of dispersed surfacant, the Tar Springs Brine phase volume being 6.5% of the total volume. Tar Springs Brine is a highly salinity brine containing 104,700 ppm of total dissolved solids. The middle phase comprising 76.5% of the total volume was a microemulsion. The composition of the middle phase was as follows: 1.3% of the monoethanolamine $C_{12}$ orthoxylene sulfonate, 1.2% of the cosurfactant, 41.5% of the oil, and 56.0% Tar Springs Brine.

The middle phase alone of the second composition was injected into a 4 foot long Berea core to determine the effectiveness of the middle phase for the recovery of residual oil. The middle phase was injected at a frontal velocity of 1 foot per day as a 0.30 PV slug followed by 1 PV of 0.75% $C_{12}H_{25}O (CH_2CH_2O)_{3.6} SO_3^- NH_4^+$ in Tar Springs Brine. The resident oil of the core was 90/10 Isopar-M/HAN while the resident water phase was Tar Springs Brine. The Tar Springs Brine phase was utilized to drive the two banks, i.e., the middle phase microemulsion and thickened water to 2.0 PV total production. As a result, the final oil saturation of the core was found to be 9.6% accounting for the injected oil. This therefore illustrates the effectiveness of the middle phase of the multiphase system in recovering residual oil.

EXAMPLE VI

A further core flooding experiment was carried out utilizing the middle phase of a multiphase system obtained by preparation of a composition in the multiphase region of the oil-water-surfactant ternary diagram. The composition in the multiphase region of the ternary diagram was prepared by mixing 1.5% of the monoethanolamine $C_{12}$ orthoxylene sulfonate, 1.65% of a cosurfactant, i.e., an ammonium sulfate of an ethoxylated $C_{18}$ phenol containing an average of 13.2 mols of ethylene oxide, 48.4% of oil, 90/10 Isopar-M/HAN mixture, and 48.45% Tar Springs Brine. After mixing and allowing the system to settle, three phases were obtained, the upper phase being an oil phase, the lower phase being a Tar Springs Brine phase with the middle phase being a microemulsion. The upper phase amounted to 11.5% of the total volume, the lower phase amounted to 16.9% of the total volume, and the middle phase, i.e., the microemulsion phase amounted to 71.6% of the total volume. Both the upper and lower phases apparently contained molecularly dispersed surfactant. The middle phase of the multiphase system was analyzed and was found to contain the following components in the following percentages:

2.1% of the surfactant monoethanolamine $C_{12}$ orthoxylene sulfonate;
2.3% of the cosurfactant;
51.6% of the oil and
44.0% of the Tar Springs Brine The procedure of Example V with regard to the flooding was repeated, except that 0.20 PV of the middle phase was injected followed by 1 PV of a thickened Tar Springs Brine containing 1.5% $C_{14}H_{29}O(CH_2CH_2O)_{4.7}SO_3^-NH_4^+$.. As in Example V, the middle microemulsion phase and thickened water were followed by Tar Springs Brine to drive the middle phase and thickened water through the core. A final oil saturation accounting for injected oil of 6.5% was obtained. Here again, the effectiveness of the middle microemulsion phase to recover residual oil when injected alone is clearly seen.

EXAMPLE VII

A further example was carried out to illustrate the effectiveness of the present invention; specifically that embodiment of the present invention wherein a middle phase microemulsion from a three-phase system within the multiphase region of the ternary diagram is injected to recover crude oil. In carrying out this example, the following materials were mixed to provide a composition within the multiphase region:

0.75 g monoethanolamine $C_{12}$ orthoxylene sulfonate,
0.675 g cosurfactant $C_{12}O(EO)_{3.6}SO_3^-NH_4^+$
49.5 ml Isopar M/HAN oil mixture 90/10, and
49.5 ml Tar Springs Brine.

When the foregoing components were mixed and when the mixture was allowed to settle, a three-phase system was formed wherein the upper and less dense phase amounting to 25.9 ml constituted excess oil with minor amounts of dispersed surfactant possibly therein, the lower and more dense phase amounting to 17.6 ml constituted excess water also possibly containing minor amounts of dispersed surfacant and the middle phase amounting to 57 ml comprised a microemulsion containing the foregoing components in the following amounts:

1.3% surfactant;
1.2% cosurfactant;
41.5% oil; and
56.0% brine

To illustrate the effectiveness of the middle phase microemulsion in the recovery of oil, one PV of the microemulsion described above was injected into a 4 foot long Berea sandstone core at a frontal velocity of 1 foot per day, the core having been initially prepared to contain a residual oil composed of 90/10 Isopar M/HAN and a resident brine of Tar Springss Brine. Through this flood, 100% of the residual oil was recovered. Subsequently a drive fluid was injected composed of 750 ppm of Kelzan XC dissolved in Tar Springs Brine for the purpose of recovering the microemulsion remaining in the core. The final unrecovered microemulsion-oil saturation after this injection was 1.8%, illustrating that displacement of the oil by a microemulsion mutually immiscible with the oil can be highly efficient in that all of the residual oil of the core can be recovered and most of the injected oil can be recovered. Furthermore, it is illustrated from this example that subsequent displacement of the microemulsion with a polymer solution drive fluid which is mutually immiscible with the microemulsion can be carried out very efficiently with the disadvantages associated with conventional microemulsion-polymer drive fluid phase behavior being completely eliminated.

While the present invention has been described primarily with regard to the foregoing specific exemplification, it should be understood that the present invention cannot under any circumstances be deemed as limited thereto but rather must be construed as broadly as all and equivalent thereof.

We claim:

1. A method of recovering crude oil from a subterranean formation having one or more injection means in fluid communication with one or more production means which comprises injecting into said formation through said injection means a first liquid slug, then injecting into said formation through said injection means a second liquid slug, said slugs being mutually immiscible and at least one of said slugs being a microemulsion, to displace crude oil in said formation toward said production means; driving said slugs through said formation by injection of a driving fluid; and recovering crude oil through said production means.

2. The method of claim 1 wherein said two slugs comprise mutually immiscible microemulsions.

3. The method of claim 2 wherein each of said microemulsions comprises:
   a. oil having physical and chemical characteristics substantially the same as the characteristics of the crude oil in said formation;
   b. an aqueous medium having physical and chemical characteristics substantially the same as the chracteristics of the water in the formation; and
   c. a surfactant.

4. The method of claim 1 wherein said microemulsion comprises:
   a. oil having physical and chemical characteristics substantially the same as the characteristics of the crude oil in said formation;
   b. an aqueous medium having physical and chemical characteristics substantially the same as the characteristics of the water in the formation; and
   c. a surfactant.

5. The method of claim 1 wherein said microemulsion further contains at least one cosurfactant.

6. The method of claim 1 wherein said mutually immiscible slugs are each injected in volumes of from 0.02 to 2 pore volumes.

7. The method of claim 6 whrein said mutually immiscible slugs are each injected in volumes of from 0.05 to 0.5 pore volumes.

8. The method of claim 1 wherein at least one of said mutually immiscible slugs contains a thickener.

9. A method of recovering crude oil from a subterranean formation having at least one injection means in fluid communication with at least one production means which comprises injecting into said formation through said injections means a microemulsion comprising an aqueous medium, an oil and a surfactant, said microemulsion being immiscible under the conditions of injection with a composition consisting essentially of said oil contained in said microemulsion; driving said microemulsion through said injection means; and recovering crude oil through said production means.

10. The method of claim 9 wherein said microemulsion comprises:

a. oil having physical and chemical characteristics substantially the same as the characteristics of the crude oil in said formation;
b. an aqueous medium having physical and chemical characteristics substantially the same as the characteristics of the formation water; and
c. a surfactant.

11. The method of claim 9 wherein said microemulsion is injected as a 0.02 to 2 PV slug.

12. The method of claim 9 wherein said microemulsion slug contains a thickener.

13. The method of claim 9 wherein said microemulsion further contains at least one cosurfacant.

14. A method of recovering crude oil from a subterranean formation having at least one injection means in fluid communication with at least one production means which comprises:
a. mixing an oil, aqueous medium and surfactant in proportions such that a composition falling within the multiphase region of an oil-water-surfactant ternary diagram is formed;
b. allowing said composition formed in step (a) to separate into mutually immiscible microemulsions in equilibrium, one more dense than the other;
c. injecting into said subterranean formation through said injection means the less dense microemulsions;
d. injecting into said subterranean formation through said injection means the more dense microemulsion, step (c) and (d) being carried out concurrently or in the order of (c) to (d);
e. injecting into said subterranean formation a driving fluid to drive said less dense microemulsion and more dense microemulsion through said formation toward said production means to displace crude oil in said formation toward said production means; and
f. recovering crude oil through said production means.

15. The method of claim 14 wherein each of said microemulsions comprise:
a. oil having physical and chemical characteristics substantially the same as the characteristics of the crude oil in said formation;
b. an aqueous medium having physical and chemical characteristics substantially the same as the characteristics of the formation water; and
c. a surfactant.

16. The method of claim 14 wherein said less dense microemulsion and more dense microemulsion are injected as 0.02 to 2 PV slugs.

17. The method of claim 16 wherein said less dense microemulsion and more dense microemulsion are injected as 0.05 to 0.5 PV slugs.

18. The method of claim 14 wherein at least one of said less dense microemulsion and more dense microemulsion further contains at least one cosurfactant.

19. The method of claim 14 wherein at least one of said less dense microemulsion and more dense microemulsion contains a thickener.

20. A method of recovering crude oil from a subterranean formation having at least one injection means in fluid communication with at least one production means which comprises:
a. mixing an oil, aqueous medium and surfactant in proportions such that a composition falling within the multiphase region of an oil-water-surfactant ternary diagram is formed, said oil having physical and chemical characteristics substantially the same as the physical and chemical characteristics of the crude oil in said formation and said aqueous medium having physical and chemical characteristics substantially the same as the physical and chemical characteristics of the formation water:
b. allowing said composition formed in step (a) to separate into multiphases at least one phase being a microemulsion and one phase being an oil phase in equilibrium with said microemulsion, the oil in said oil phase having physical and chemical properties substantially the same as the physical and chemical properties of the crude oil in said formation;
c. separating said microemulsion from said oil phase;
d. injecting into said subterranean formation through said injection means said microemulsion;
e. injecting into said subterranean formation through said injection means a driving fluid to drive said microemulsion through said formation toward said production means to displace crude oil in said formation toward said production means; and
f. recovering crude oil through said production means.

21. The method of claim 20 wherein said microemulsion is injected as a 0.02 to 2 PV slug.

22. The method of claim 21 wherein said microemulsion is injected as a 0.05 to 0.5 PV slug.

23. The method of claim 20 wherein said microemulsion contains a thickener.

24. The method of claim 20 wherein said microemulsion further contains at least one cosurfactant.

25. A method of recovering crude oil from a subterranean formation having at least one injection means in fluid communication with at least one production means which comprises:
a. mixing an oil, aqueous medium, and surfactant in proportions such that a composition falling within the multiphase region of an oil-water-surfactant ternary diagram is formed;
b. allowing said composition formed in step (a) to separate into a multiplicity of mutually immiscible phases in equilibrium, one of said phases being a predominantly oil phase;
c. separating from said mutually immiscible phases at least one microemulsion phase immiscible with said predominantly oil phase;
d. injecting into said formation through said injection means at least one microemulsion phase separated in step (c) from said predominantly oil phase;
e. injecting into said formation a drive fluid to drive said injected phases through said formation toward said production means to displace crude oil toward said production means; and
f. recovering crude oil through said production means.

26. The method of claim 25 wherein said oil has physical and chemical characterisitics substantially the same as the physical and chemical characteristics of the formation crude and said aqueous medium has physical and chemical characteristics substantially the same as the physical and chemical characteristics of the formation water.

27. The method of claim 25 wherein the phase injected in step (d) is injected as a 0.02 to 2 PV slug.

28. The method of claim 27 wherein the phase injected in step (d) is injected as a 0.05 to 0.5 slug.

29. The method of claim 25 wherein the phase injected in step (d) contains a thickener.

30. The method of claim 25 wwherein the microemulsion phase injected in step (d) contains a cosurfactant.

31. A method of recovering crude oil from a subterranean formation having at least one injection means in fluid communication with at least one production means, which comprises:
   a. mixing an oil, aqueous medium and surfactant in proportions such that a composition falling within the multiphase region of an oil-water-surfactant ternary diagram is formed, the amounts of said oil, aqueous medium, and surfactant being less than the amounts to be injected into said formation;
   b. allowing said composition formed in step (a) to separate into multitphases, at least two phases comprising microemulsions, one more dense than the other, said microemulsions being mutually immiscible and in equilibrium;
   c. analyzing the more dense microemulsion and less dense microemulsion to determine the percentage of oil, aqueous medium and surfactant therein;
   d. separately preparing a microemulsion of substantially the same composition as said more dense microemulsion analyzed in step (c) and separately preparing a microemulsion of substantially the same composition of said less dense microemulsion analyzed in step (c);
   e. injecting into said subterranean formation said less dense microemulsion formed in step (d) in a volume effective to displace oil in said formation;
   f. injecting into said subterranean formation said more dense microemulsion formed in step (d) in a volume effective to displace oil in said formation, step (e) and (f) being carried out concurrently or in the order of (e) to (f);
   g. injecting into said formation a drive fluid to drive said less dense microemulsion and more dense microemulsion through said formation toward said production means; and
   h. recovering crude oil through said production means.

32. The method of claim 31 wherein each of said more dense and less dense microemulsions comprises:
   a. oil having physical and chemical characteristics substantially the same as the characteristics of the crude oil in said formation;
   b. an aqueous medium having physical and chemical characteristics substantially the same as the characteristics of the formation water; and
   c. a surfactant.

33. The method of claim 31 wherein said less dense microemulsion and more dense microemulsion are injected as 0.02 to 2 PV slugs.

34. The method of claim 33 wherein said less dense microemulsion and more dense microemulsion are each injected as 0.05 to 0.5 PV slugs.

35. The method of claim 31 wherein at least one of said less dense microemulsion and more dense microemulsion contains a thickener.

36. The method of claim 31 wherein at least one of said more dense microemulsion and less dense microemulsion includes at least one cosurfactant.

37. A method of recovering crude oil from a subterranean formation having at least one injection means in fluid communication with at least one production means which comprises:
   a. mixing an oil, aqueous medium, and surfactant in proportion such that a composition falling within the multiphase region of an oil-water-surfactant ternary diagram is formed, the amounts of said oil, aqueous medium, and surfactant being less than the amounts to be injected into said formation.
   b. allowing said composition formed in step (a) to separate into multiphases at least one phase being a microemulsion and one phase being a predominantly oil phase in equilibrium with said microemulsion;
   c. analyzing said microemulsion to determine the percentage of oil, aqueous medium, and surfactant therein;
   d. separately preparing a microemulsion of substantially the same composition as said microemulsion analyzed in step (c);
   e. injecting into said subterranean formation said microullsion formed in step (d) in a volume effective to displace oil in said formation;
   f. injecting into said formation a drive fluid to drive said microemulsion through said formation toward said production means; and
   g. recovering crude oil through said production means.

38. The method of claim 37 wherein said microemulsion is injected as a 0.02 to 2 PV slug.

39. The method of claim 38 wherein said microemulsion is injected as a 0.05 to 0.5 PV slug.

40. The method of claim 37 wherein said microemulsion further contains at least one cosurfactant.

41. The method of claim 37 wherein said microemulsion contains a thickener.

42. The method of claim 37 wherein the oil in said oil phase has physical and chemical properties closely approximating the physical and chemical properties of the crude oil in said formation and said aqueous medium having physical and chemical characteristics closely approximating the physical and chemical characteristics of the formation water.

43. A method of recovering crude oil from a subterranean formation having at least one injection means in fluid communication with at least one production means which comprises:
   a. mixing an oil, aqueous medium, and surfactant in proportions such that a composition falling within the multiphase region of an oil-water-surfactant ternary diagram is formed, the amounts of said oil, aqueous medium, and surfactant being less than the amounts to be injected into said formation;
   b. allowing said composition formed in step (a) to separate into a multiplicity of mutually immiscible phase in equilibrium, one of said phases being a predominantly oil phase;
   c. separating from said mutually immiscible phases at lease one microemulsion phase immiscible with said predominantly oil phase;
   d. analyzing said at least one microemulsion phase immiscible with said oil phase separated in step (c) to determine the percentage of oil, aqueous medium, and surfactant;
   e. separately preparing a composition of substantially the same composition as said at least one microemulsion phase immiscible with said oil phase analyzed in step (d);

f. injecting into said subterranean formation said composition prepared in step (e);

g. injecting into said formation a drive fluid to drive said injected at least one phase through said formation toward said production means; and h. recovering crude oil through said production means.

44. A method of recovering crude oil from a subterranean formation having at least one injection means in fluid communication with at least one production means which comprises:

a. mixing an oil, aqueous medium, and surfactant in proportions such that a composition falling within the muliphase region of an oil-water-surfactant ternary diagram is formed;

b. allowing said composition formed in step (a) to separate into a multiplicity of mutually immiscible phases in equilibrium;

c. injecting into said formation at least one microemulsion phase of said mutually immiscible phases;

d. injecting a drive fluid into said formation to drive said mutually immiscible phases through said formation toward said production means to displace crude oil toward said production means; and e. recovering crude oil through said production means.

45. A method of recovering crude oil from a subterranean formation having at least one injection means in fluid communication with at least one production means which comprises:

a. mixing an oil, aqueous medium, and surfactant in proportions such that a composition falling within the multiphase region of an oil-water-surfactant ternary diagram is formed;

b. allowing said composition formed in step (a) to separate into a multiplicity of mutually immiscible phases in equlibrium;

c. injecting into said formation one microemulsion composition having substantially the same chemical composition as one of said mutually immiscible phases;

d. injecting a drive fluid into said formation to drive said composition through said formation toward said production means to displace crude oil toward said production means; and e. recovering crude oil through said production means.

46. A method of recovering crude oil from a subterranean formation having at least one injection means in fluid communication with at least one production means which comprises:

a. mixing an oil, aqueous medium and surfactant in proportions such that a composition falling within the multiphase region of an oil-water-surfactant ternary diagram is formed;

b. allowing said composition formed in step (a) to separate into three mutually immiscible phases in equilibrium, one of said phases being a predominantly oil phase, one of said phases being a predominantly aqueous phase and one of said phases being a microemulsion;

c. separating said microemulsion from the remaining of said three phases formed in step (b);

d. injecting into said subterranean formation through said injection means said microemulsion;

e. injecting into said subterranean formation through said injection means a driving fluid to drive said microemulsion through said formation toward said production means to displace crude oil in said formation toward said production means; and f. recovering crude oil through said production means.

47. The method of claiam 46 wherein said microemulsion is injected as a 0.02 to 2 PV slug.

48. The method of claim 47 wherein said microemulsion is injected as a 0.05 to 0.5 PV slug.

49. The method of claim 46 wherein said microemulsion further contains at least one cosurfactant.

50. The method of claim 46 wherein said microemulsion further contains a thickener.

51. A method of recovering crude oil for a subterranean formation having at least one injection means in fluid communication with at least one production means which comprises:

a. mixing an oil, aqueous medium, and surfactant in proportions such that a composition falling within the multiphase region of an oil-water-surfactant ternary diagram is formed, said oil having physical and chemical characteristics substantially the same as the physical and chemical characteristics of the crude oil in said formation and said aqueous medium having physical and chemical characteristics subtantially the same as the physical and chemical characteristics of the formation water;

b. allowing said composition formed in step (a) to separate into three mutually immiscible phases in equilibrium, one of said phases being a predominantly oil phase, one of said phases being a predominantly aqueous phase and one of said phases being a microemulsion;

c. separating said microemulsion from the remaining of said three phases formed in step (b);

d. injecting into said subterranean formation through said injection means said microemulsion;

e. injecting into said subterranean formation through said injection means a driving fluid to drive said microemulsion through said formation toward said production means to displace crude oil in said formation toward said production means; and f. recovering crude oil through said production means.

52. A method of recovering crude oil from a subterranean formation having at least one injection means in fluid communication with at least one production means which comprises:

a. mixing an oil, aqueous medium and surfactant in proportions such that a composition falling within the multiphase region of an oil-water-surfactant ternary diagram is formed, the amounts of said oil, aqueous medium, and surfactant being less than the amounts to be injected into said formation;

b. allowing said composition formed in step (a) to separate into three mutually immiscible phases in equilibrium, one of said phases being a precominantly oil phase, one of said phases being a predominantly aqueous phase and one of said phases being a microemulsion;

c. analyzing said microemulsion to determinne the percentage of oil, aqueous medium and surfactant therein;

d. separately preparing a microemulsion of substantially the same composition as said microemulsion analyzed in step (c);

e. injecting into said subterranean formation through said injection means said microemulsion prepared in step (d);

f. injecting into said subterranean formation through said injection means a driving fluid to drive said microemulsion through said formation toward said production means to displace crude oil in said formation toward said production means; and g. recovering crude oil through said production means.

53. The method of claim 52 wherein the oil in said oil phase has physical and chemical properties closely approximating the physical and chemical properties of the crude oil in said formation and said aqueous medium has physical and chemical characteristics closely approximating the physical and chemical characteristics of the formation water.

54. A method of recovering crude oil from a subterranean formation having at least one injection means in fluid communication with at least one production means which comprises:

a. mixing an oil, aqueous medium, and surfactant in proportions such that a composition falling within the multiphase region of an oil-water-surfactant ternary diagram is formed;

b. allowing said composition formed in step (a) to separate into a multiplicity of mutually immiscible phases in equilibrium, one of said phases being a predominantly aqueous phase;

c. separating from said mutually immiscible phases at least one microemulsion phase immiscible with said predominantly aqueous phase;

d. injecting into said subterranean formation a microemulsion phase having substantially the same composition as said microemulsion phase separated in step (c);

e. injecting into said formation a drive fluid to drive said injected at least one microemulsion phase through said formation toward said production means; and f. recovering crude oil through said production means.

55. The method of claim 54 where said oil has physical and chemical characteristics closely approximating the physical and chemical characteristics of the crude oil in said formation and said aqueous medium has physical and chemical characteristics of the formation water.

56. A method of recovering crude oil from a subterranean formation having at least one injection means in fluid communication with at least one production means which comprises:

a. mixing an oil, aqueous medium, and surfactant in proportions such that a composition falling within the multiphase region of an oil-water-surfactant ternary diagram is formed, the amounts of said oil, aqueous medium, and surfactant being less than the amounts to be injected into said formation;

b. allowing said composition formed in step (a) to separate into a multiplicity of mutually immiscible phases in equilibrium, one of said phases being a predominantly aqueous phase possibly containing minor amounts of surfactant;

c. separating from said mutually immiscible phases at least one microemulsion phase immiscible with said predominantely aqueous phase;

d. analyzing said at least one microemulsion phase immiscible with said aqueous phase separated in step (c) to determine the percentages of oil, aqueous medium, and surfactant;

e. separately preparing a composition of substantially the same composition as said at least one microemulsion phase immiscible with said aqueous phase analyzed in step (d);

f. injecting into said subterranean formation said composition prepared in step (e);

g. injecting into said formation a drive fluid to drive said injected at least one phase through said formation toward said production means; an h. recovering crude oil through said production means.

57. The method of claim 56 wherein the oil in said oil phase has physical and chemical properties closely approximating the physical and chemical properties of the crude oil in said formation and said aqueous medium having physical and chemical characteristics closely approximating the physical and chemical characteristics of the formation water.

58. A method of recovering crude oil from a subterranean formation which comprises injecting into said formation a microemulsion system comprising an aqueous medium, a hydrocarbon, and a surfactant, said microemulsion system being approximately on a binodal curve separating a multiphase region and a single phase region in a ternary phase diagram of said microemulsion system, displacing said microemulsion system through said formation, and recovering crude oil from said formation.

59. A method as defined in claim 58 wherein said microemulsion system is immiscible with the hydrocarbon in said system at equilibrium.

* * * * *